US009374292B2

(12) United States Patent
Tetteh et al.

(10) Patent No.: US 9,374,292 B2
(45) Date of Patent: Jun. 21, 2016

(54) FREQUENCY ASSIGNMENT WITH DYNAMIC MULTI-TRANSCEIVER RESOURCES

(71) Applicant: Raytheon BBN Technologies Corp., Cambridge, MA (US)

(72) Inventors: William Nii Tetteh, Cambridge, MA (US); Christophe Jean-Claude Merlin, Malden, MA (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 274 days.

(21) Appl. No.: 13/803,124

(22) Filed: Mar. 14, 2013

(65) Prior Publication Data
US 2014/0269408 A1 Sep. 18, 2014

(51) Int. Cl.
| | |
|---|---|
| *H04L 12/751* | (2013.01) |
| *H04W 28/16* | (2009.01) |
| *H04W 24/02* | (2009.01) |
| *H04W 88/08* | (2009.01) |

(52) U.S. Cl.
CPC .............. *H04L 45/02* (2013.01); *H04W 24/02* (2013.01); *H04W 28/16* (2013.01); *H04W 88/08* (2013.01)

(58) Field of Classification Search
CPC ..... H04W 16/10; H04W 16/12; H04W 36/16; H04W 72/0453; H04W 72/0486; H04W 28/16; H04W 24/02; H04W 88/08; H04L 145/02; H04L 45/02
USPC ........................ 370/254, 351; 455/452.1, 447
See application file for complete search history.

(56) References Cited

U.S. PATENT DOCUMENTS

| 7,979,666 B2 * | 7/2011 | Rixner et al. ................. 711/202 |
| 2003/0126246 A1 * | 7/2003 | Blouin et al. ................. 709/223 |
| 2007/0070918 A1 * | 3/2007 | Hershey ........................ 370/254 |
| 2008/0159207 A1 * | 7/2008 | Levine et al. ................. 370/329 |
| 2008/0175170 A1 * | 7/2008 | Ross et al. .................... 370/255 |
| 2008/0181130 A1 * | 7/2008 | Balu et al. .................... 370/254 |
| 2009/0141621 A1 * | 6/2009 | Fan et al. ...................... 370/223 |

* cited by examiner

*Primary Examiner* — Christopher Grey
(74) *Attorney, Agent, or Firm* — Schwegman Lundberg & Woessner, P.A.

(57) ABSTRACT

Embodiments of a system and method for providing frequency assignment with managed transceiver resources. A frequency assignment protocol manages transceiver resources in making channel assignment decisions based on a number of links and state of transceivers. Long-term traffic patterns are captured and transceiver resource decisions are made based on an analysis of the captured long-term traffic patterns to increase a selected metric, such as connectivity, capacity or any other measurable quantity.

24 Claims, 8 Drawing Sheets

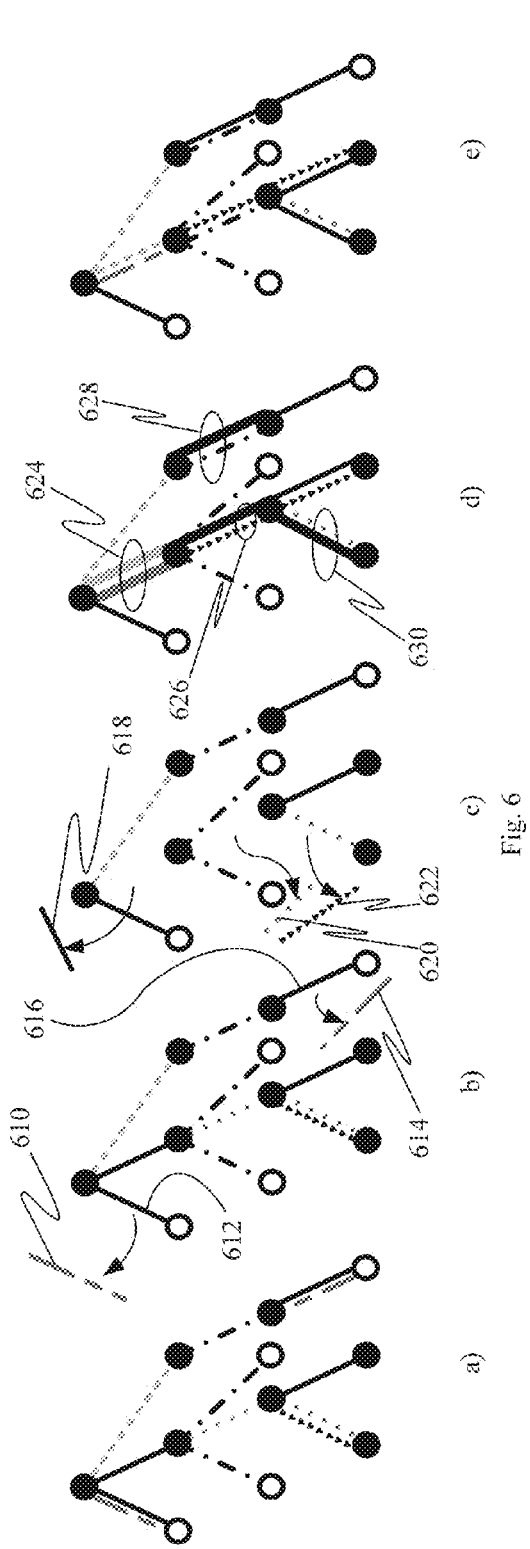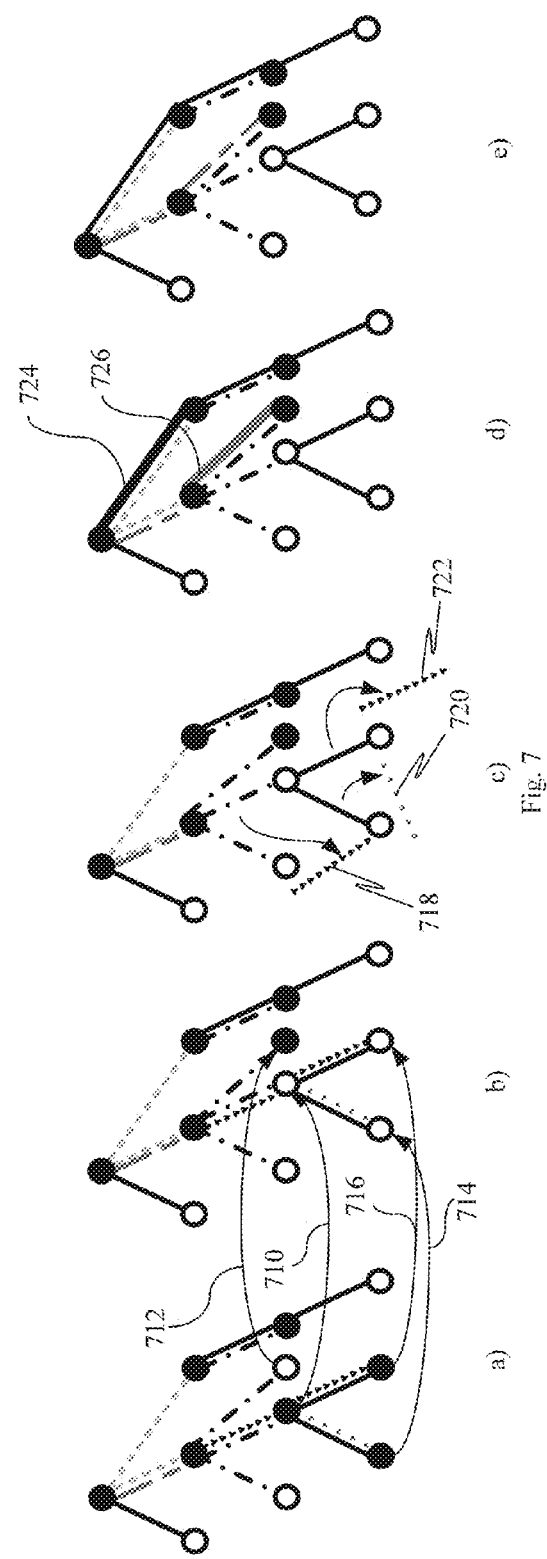

FREQUENCY ASSIGNMENT WITH DYNAMIC MULTI-TRANSCEIVER RESOURCES

GOVERNMENT RIGHTS

The government owns rights in the present invention pursuant to contract FA8750-11-C-0201, awarded by the Department of the Air Force.

BACKGROUND

Networks of the future will deliver voice and video streams to and from any confine of the network. In particular, multicast video traffic will stretch the network's throughput and delay capabilities and will rely on advanced management of concurrent transmissions to multiple targets. The goals set for multicast video streaming involve managing transmissions to targets on different frequencies or data rates, such as is common in frequency-hopping MACs (media access control) or other cognitive radios. More generally, new communication devices like cell phones include different communication interfaces such as Bluetooth, WiFi, Cellular 3G and 4G networks, GPS (global positioning system), etc.

Systems are built as a combination of the IEEE (Institute of Electrical and Electronic Engineers) 802.11 set of standards for implementing wireless local area network (WLAN) computer communication, the IEEE 802.15.4 standard specifies the physical layer and media access control for low-rate wireless personal area networks (LR-WPANs). The IEEE 802.15.1 standard defines the lower transport layers of the Bluetooth™ wireless technology for wireless personal area networks (WPANs), etc. Other standards in the 802.xx family of standards define other technologies such as ultra wideband, Bluetooth, mesh networks, bridging, mobile broadband wireless access, etc. However, issues at the MAC layer may involve addressing neighbor coverage by different interfaces, concurrent link usage, etc.

Non-homogeneous transceivers that provide the different communication interfaces communicate with different neighbors at different costs and provide a unified layer of abstraction to use interfaces in an efficient manner. Cell phones, personal digital assistants (PDAs), radio systems, etc. may include multiple transceivers whose frequency, connectivity, capacity, throughput, and/or other network metrics has a significant impact on the performance of the network.

The core of frequency assignment is a heuristic for the choice of frequencies for each transceiver. A set of wireless communication transceivers may be assigned frequencies such that data transmission between the two transceivers is possible. The frequencies may be selected from a given set that may differ among transceivers. However, the frequencies assigned to two transceivers may incur interference on one another, resulting in quality loss of the signal. Further, different sets of neighbors may be reachable on different frequencies. Accordingly, more commonality in frequencies is better for connectivity but reduces spatial reuse. Dynamic channel assignment (DCA) schemes are believed to achieve higher system capacity and spectrum efficiency in a frequency-reuse wireless system. However, frequency assignment protocols do not consider the number or state of transceivers at the node itself, or at neighbors or potential neighbors.

BRIEF DESCRIPTION OF THE DRAWINGS

FIGS. 6a-e illustrate the transitioning of the network configuration shown in FIG. 3 to the network configuration shown in FIG. 4 according to an embodiment;

FIGS. 7a-e illustrate the transitioning of the network configuration shown in FIG. 4 to the network configuration shown in FIG. 5 according to an embodiment;

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass equivalents of those claims.

A frequency assignment protocol manages transceiver resources in making channel assignment decisions based on the number of assigned (on and ready for communication), unassigned (on but not given a frequency on which to communicate) and inactive (off) transceivers and their evolution over time in order to increase a metric M, which can be connectivity, capacity or any other measurable quantity.

In an idealized network, transceivers would be assigned and unassigned in a way that maximizes a chosen network metric. Unfortunately, this is highly impractical as traffic patterns in the network change quite often over time. These changes cause routes to be recomputed and assignments to be dropped or made frequently. Instead, long-term traffic patterns are captured and decisions are made based on an analysis of the captured long-term traffic patterns. Transceiver managers activate or deactivate transceivers along the data path with a view on long term traffic patterns. Thus, network metrics may be improved along the data path.

Figure 1:
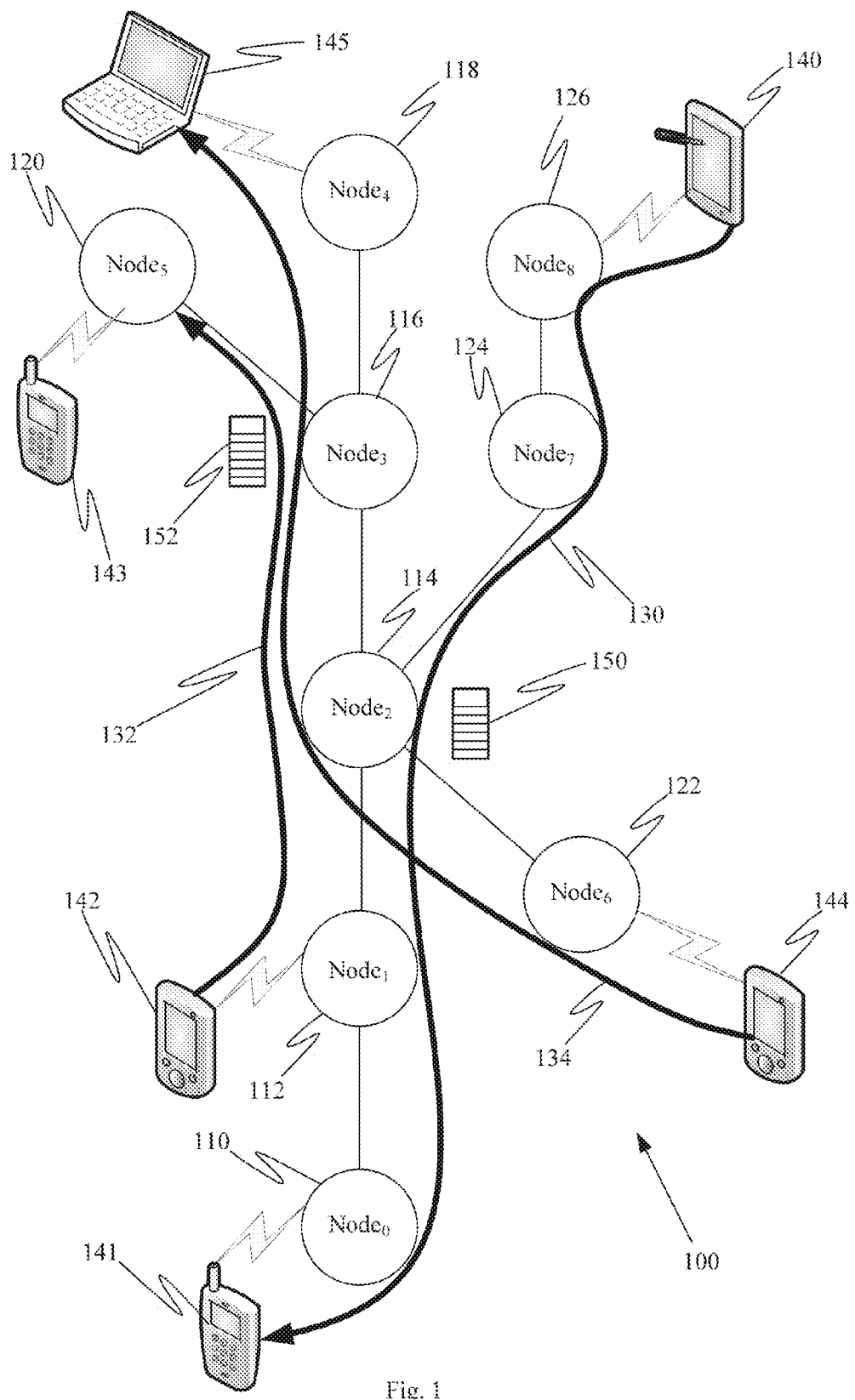
FIG. 1 illustrates a communication network having a plurality of data flows through a plurality of nodes according to an embodiment.

FIG. 1 illustrates a communication network 100 having a plurality of data flows through a plurality of nodes. In FIG. 1, nine nodes 110-126, i.e., $Node_0$-$Node_8$, are shown in the network 100. First data flow 130 flows from wireless device 140 through nodes 126, 124, 114, 112, 110 to wireless device 141. Second data flow 132 flows from wireless device 142 through nodes 112, 114, 116, 120 to wireless device 143. Third data flow 134 flows from wireless device 144 through nodes 122, 114, 116, 118 to wireless device 145. Because of the data or traffic load through $Node_2$ 114 and $Node_3$ 116, the queue depth for data queues 150, 152 may become greater than a selected threshold. In addition, to increase a metric M, which can be connectivity, capacity or any other measurable quantity, at least one of nodes 110-126 may make channel assignment decisions based on the number of assigned (on and ready for communication), unassigned (on but not given a frequency on which to communicate) and inactive (off) transceivers and their evolution over time.

A transceiver resource manager (XRM) captures long-term traffic patterns for nodes 110-126. In such an instance, transceivers may need to be activated or deactivated and assigned frequency assignments may need to be modified to increate a selected metric. However, frequency assignment protocols complicate transceiver ramp-up in multicast traffic. For example, a node, such as $Node_3$ 116, may have two multicast targets, $Node_4$ 118 and $Node_5$ 120, and the targets may have two active transceivers, wherein one of the transceivers is assigned as a channel common to all nodes (used to guarantee connectivity at all times). Nodes cannot assign the same frequency or there would only be four (in this case) channels in the network, which does not promote frequency diversity and space reuse. Thus, one of the target nodes may not be able to assign the frequencies used by $N_0$. Thus, XRM may activate or deactivate transceivers, which modifies frequency assignments based on long term traffic patterns to improve network performance along a data path according to the selected metric.

Figure 2:
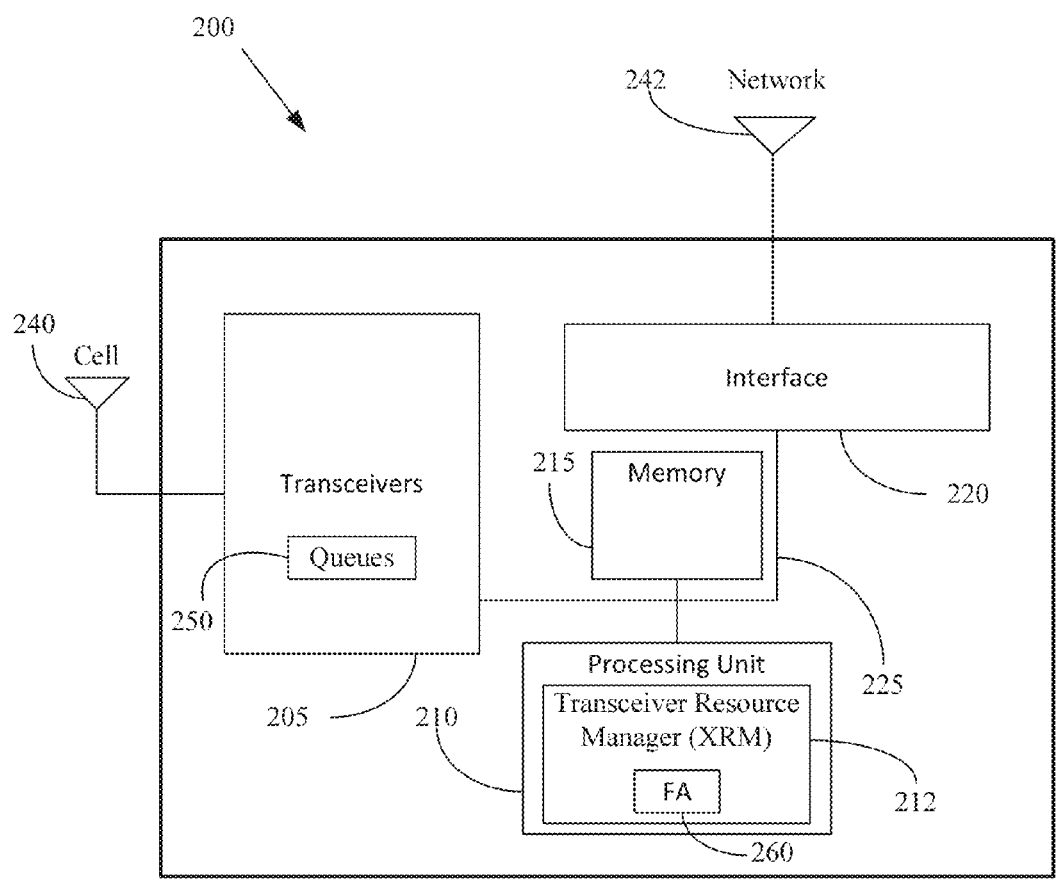
FIG. 2 illustrates an exemplary implementation of a node according to an embodiment.

FIG. 2 illustrates an exemplary implementation of a node 200 according to an embodiment. Node 200 may be an Evolved Node B (eNodeB), base transceiver station (BTS), wireless access point (AP), router, etc. The node 200 may include a plurality of transceivers 205, a processing unit 210, a memory 215, an interface 220 and a bus 225. Transceivers 205 may include transceiver circuitry that may be activated for transmitting and/or receiving symbol sequences using radio frequency signals via one or more antennas 240, 242. Transceivers 205 may also include queues 250 for buffering data. The frequency used by transceivers 205 may be selected by XRM 212 provided by processing unit 210.

Processing unit 210 may include a processor, microprocessor, or processing logic that may interpret and execute instructions. Processing unit 210 may perform the device data processing functions and other functions of node 200. For example, by way of transceivers 205 node 200 may receive packets for processing and forwarding to subsequent nodes. Processing unit may also implement a transceiver resource manager (XRM) 212 according to an embodiment. Alternatively, XRM 212 may be implemented in a stand-alone device or provided further upstream or downstream from any particular node. For example, the XRM may be provided at a headend in an optical communications system, a mobile switching center in a 2G wireless network, a serving gateway and/or mobility management entity (MME) in a 4G wireless network, e.g., LTE (long term evolution), or other components of a packet-based communications infrastructure. Those skilled in the art will recognize from this description that embodiments are not meant to be confined or limited to the entities mentioned herein, but may depend on the technology implemented or other design decisions.

Memory 215 may provide permanent, semi-permanent, or temporary working storage of data and instructions for use by processing unit 210 in performing device processing functions. Memory 215 may include read only memory (ROM), random access memory (RAM), large-capacity storage devices, such as a magnetic and/or optical recording medium and its corresponding drive, and/or other types of memory devices. Interface 220 may include circuitry for interfacing with a link that connects to a network. Bus 225 may interconnect the various components of node 200 to permit the components to communicate with one another. However, the arrangement of components of device 200 illustrated in FIG. 2 is for illustrative purposes. Other arrangements with more, fewer, or a different arrangement of components, or the use of different or related standards may be implemented.

The XRM 212 activates or deactivates transceivers along the data path, with a view on long term traffic patterns. XRM 212 offers a practical way of improving M along the data path, wherein metric M may be connectivity, capacity or any other measurable quantity. XRM 212 includes a frequency assignment device 260. Accordingly, XRM 212 provides a node with the optimal number of transceivers and the most efficient frequency assignments to improve network traffic based on a selected metric. The decisions made by XRM 212 have consequences for frequency assignment in terms of matching the routing tree to data flows and convergence time.

However, if the number or state of transceivers at the node, or at neighbors or potential neighbors, are not considered, frequency assignments may leave a transceivers 205 assigned to frequencies that are not in fact directly useful, thereby leaving the sender with the same number of links to its destinations. XRM 212 handles this frequency assignment (FA) limitation by adding more transceivers in a manner that considers long term traffic patterns.

For example, if the metric M reflects connectivity, FA 260 favors poorly connected neighbors at the time of assigning newly available transceivers. FA 260 selects eligible frequencies that connect to the greatest number of potential neighbors, e.g., nodes that would be neighbors if they shared the same frequency. If, on the other hand, M is a measure of capacity, FA 260 selects eligible frequencies that increase the number of links to previous- and next-hop neighbors. When XRM 212 suggests using fewer transceivers, the order of importance of currently assigned channel is computed in order to preserve the highest level of metric M. In particular, if connectivity is of importance to the network, FA 260 will remove the channel that takes away the smallest number of neighbors.

Figure 3:
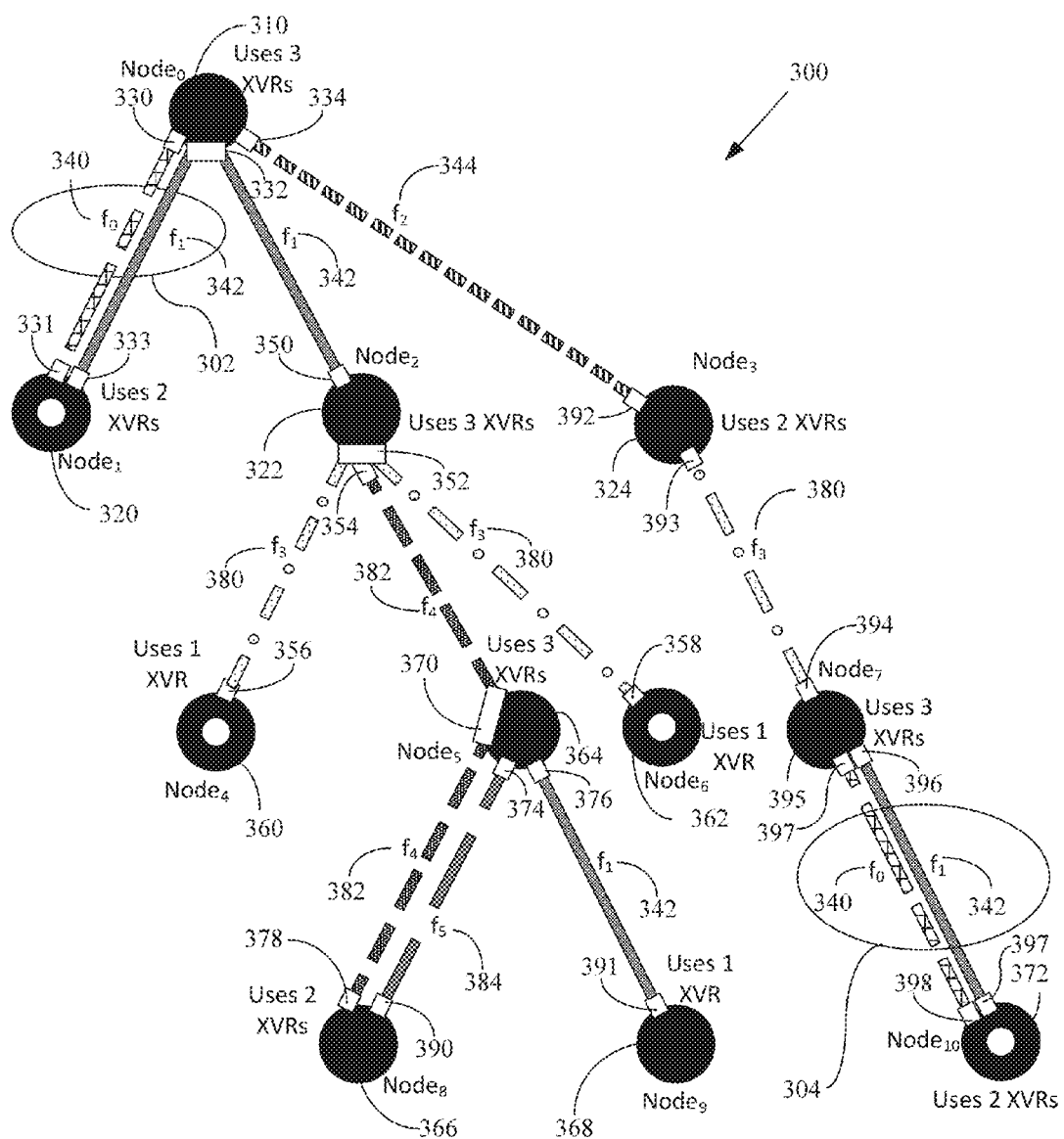
FIG. 3 illustrates a network having bottlenecks where non-data path nodes include multiple links to nodes in the data path.

FIG. 3 illustrates a network 300 having bottlenecks where nodes not on the data path are capturing frequencies away from nodes in the data path. All nodes start with their four transceivers, which Frequency Assignment (FA) 260 as shown in FIG. 2, associates with a given frequency, represented herein by different dashed lines. Closed nodes in black are along the data traffic path while unfilled or opened nodes do not participate in the data transmissions. In FIG. 3, $node_0$ 310 is at the top of the routing tree. Non-data path $node_1$ 320 and data path nodes, $node_2$ 322, $node_3$ 324, are coupled to $node_0$ 310. $Node_0$ 310 uses three transceivers 330, 332, 334. Transceiver 330 and transceiver 332 are linked to $node_1$ 320. Transceiver 332 is also linked with $node_2$ 322. Transceiver 330 uses a first frequency, $f_0$ 340, transceiver 332 uses a second frequency, $f_1$ 342, and transceiver 334 uses a third frequency, $f_2$ 344. Non-data path $node_1$ 320 uses two transceivers 331, 333, which use first frequency, $f_0$ 340 and second frequency, $f_1$ 342, respectively.

Data path $node_2$ 322 is coupled to $node_0$ 310 at the top of the routing tree, and to non-data path $node_4$ 360, non-data path $node_6$ 362 and to data path $node_5$ 364. Data path $node_2$ 322 uses 3 transceivers 350, 352, 354. Transceiver 350 uses the second frequency, $f_1$ 342, transceiver 352 uses a fourth frequency, $f_3$ 380, and transceiver 354 uses a fifth frequency, $f_4$ 382. Non-data path $node_4$ 360 uses one transceiver 356 and non-data path $node_6$ 362 uses one transceiver 458. Transceivers 356, 358 use fourth frequency, $f_3$ 380.

Data path $node_5$ 364 is coupled to data path $node_8$ 366 and data path $node_9$ 368. Data path $node_5$ 364 uses three 370, 374, 376. Transceiver 370 uses fifth frequency, $f_4$ 382, transceiver 374 uses sixth frequency, $f_5$ 384, and transceiver 376 uses second frequency, $f_1$ 342. Data path $node_8$ 366 uses transceivers 378, 390 and data path $node_9$ 368 uses transceiver 391.

Transceivers 378 uses fifth frequency, $f_4$ 382, transceiver 390 uses sixth frequency, $f_5$ 384, and transceiver 391 uses second frequency, $f_1$ 342

Data path node$_3$ 324 is coupled to data path node$_7$ 395. Data path node$_3$ 324 uses transceivers 392, 393. Transceiver 392 uses third frequency, $f_2$ 344 and transceiver 393 uses fourth frequency, $f_3$ 380. Data path node$_7$ 395 uses three transceivers 394, 396, 397. Transceiver 394 uses fourth frequency, $f_3$ 380, transceiver 397 uses first frequency, $f_0$ 340, and transceiver 396 uses second frequency, $f_1$ 342. Non-data path node$_{10}$ 372 uses two transceivers 397, 398. Transceiver 397 use second frequency, $f_1$ 342 and transceiver 398 uses first frequency, $f_0$ 340.

The network 300 in FIG. 3 represents time $t_0$, wherein recent traffic paths have allowed bottlenecks, e.g., inefficient use of transceivers/frequencies, to appear. In FIG. 3, two bottlenecks 302, 304 are shown, which "lock" data path nodes out of useful frequencies. Non-data path node$_1$ 320 is using two transceivers 331, 333, whereas data path node$_2$ 322 and data path node$_3$ 324 only use one transceiver each, i.e., transceiver 350 and transceiver 392, which limits data path node$_2$ 322 and data path node$_3$ 324 to one link each using second frequency, $f_1$ 342 for data path node$_2$ 322 and third frequency, $f_2$ 344. Regarding bottleneck 302, richer connectivity may be provided if at least one additional links was created between node$_2$ 322 and node$_0$ 310 and/or between node$_3$ 324 and node$_2$ 322. Regarding bottleneck 304, richer connectivity may be provided if at least one additional links was created between node$_3$ 324 and node$_7$ 395.

However, as time progresses, the transceiver manager, e.g., XRM 212 as shown in FIG. 2, for example, requests non-data path nodes to stop using a transceiver at the non-data path node thereby leaving data path nodes with additional, free transceivers to use and add links with traffic destinations. FA uses these active transceivers to add connectivity between data path nodes to eliminate bottlenecks.

Figure 4:
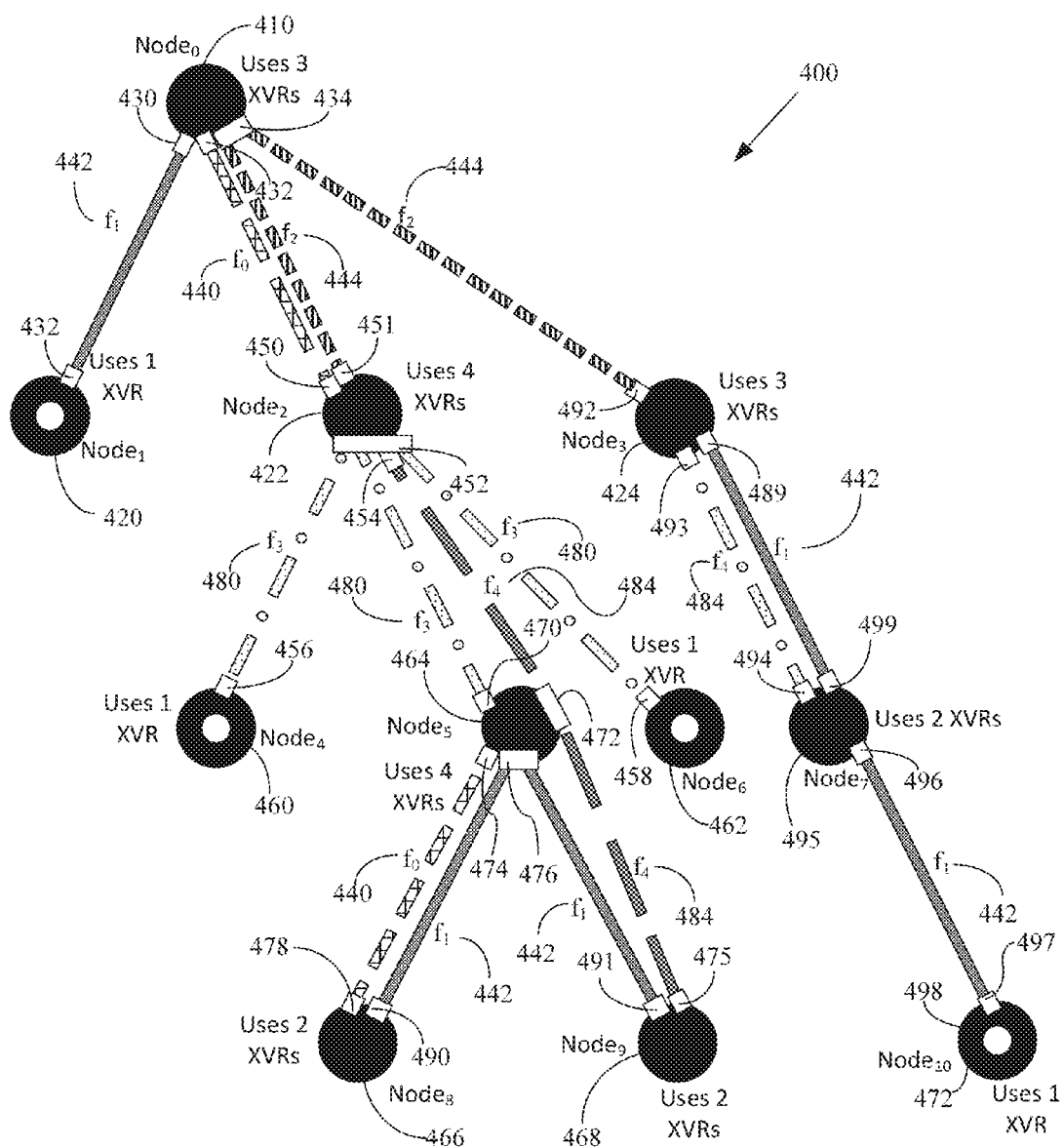
FIG. 4 illustrates a network wherein links to non-data path nodes have been removed and an additional link is created between data path nodes according to an embodiment.

FIG. 4 illustrates a network 400 wherein links to non-data path nodes have been removed and an additional link is created between data path nodes according to an embodiment. FIG. 4 illustrates the network 400 at time $t_1$. In FIG. 4, the transceiver manager XRM 212 has directed the non-data path nodes to discontinue the use of all four transceivers, leaving the data path nodes free transceivers. The data path nodes activate transceivers to add connectivity between data path nodes to eliminate the bottlenecks at time $t_1$.

In FIG. 4, In FIG. 4, node$_0$ 410 is at the top of the routing tree. Non-data path node$_1$ 420 and data path nodes, node$_2$ 422, node$_3$ 424, are coupled to node$_0$ 410. Node$_0$ 410 uses three transceivers 430, 432, 434. Transceiver 430 is linked to node$_1$ 420, wherein node$_1$ 420 includes one transceiver 432. Transceiver 432 is linked with node$_2$ 422. Transceiver 434 links to both node$_2$ 422 and to node$_3$ 424. The first frequency, $f_0$ 440, is used by transceiver 432 to link to node$_2$ 422. Transceiver 430 uses second frequency, $f_1$ 442, to link node$_0$ 410 to node$_1$ 420. However, now third frequency, $f_2$ 444, is used by transceiver 434 to link to both node$_2$ 422 and to node$_3$ 424. Therefore, the bottleneck caused by node$_1$ 420 using two transceivers has been eliminated. Node$_3$ 424 still uses one transceiver 492 to complete the link with node$_0$ 410. However, node$_2$ 422 now uses four transceivers, wherein two transceiver 450, 451 are used to link with node$_0$ 410. Transceiver 452 couples node$_2$ 422 to node$_4$ 460, node$_5$ 464 and node$_6$ 462. Node$_2$ 422 includes a fourth transceiver 454 to provide a second link to node$_5$ 460. Data path node$_2$ 422 is coupled to node$_4$ 460, node$_5$ 460 and node$_6$ 462 through fourth frequency, $f_3$ 480.

Transceiver 454 to node5 464 using fifth frequency, $f_4$ 484. Transceiver 456 couples node$_4$ 460 to node$_2$ 422 using fourth frequency, $f_3$ 480.

Data path node$_5$ 464 is coupled to data path node$_8$ 466 and data path node$_9$ 468. Data path node$_5$ 464 uses four transceivers 470, 472, 474, 476. Transceiver 470 completes the link with node$_2$ 422 using fourth frequency, $f_3$ 480. Transceiver 472 completes the link with node$_2$ 422 using fifth frequency, $f_4$ 484. Transceiver 474 uses first frequency, $f_0$ 440 to link to node$_8$ 466. Transceiver 476 uses second frequency, $f_1$ 442 to link to both data path node$_8$ 466 and data path node$_9$ 468. Transceiver 472 is also used to link to data path node$_9$ 468 using fifth frequency, $f_4$ 484. Node$_8$ 466 is coupled to node$_5$ 464 through two links by transceivers 478, 490. Transceivers 478, 490 use first frequency, $f_0$ 440, second frequency, $f_1$ 442, respectively. Node$_9$ 468 uses transceiver 475 to link to node$_5$ 464 using fifth frequency, $f_4$ 484. Node$_9$ 468 also uses transceiver 491 to link to node$_5$ 464 using second frequency, $f_1$ 442.

Data path node$_3$ 424 is coupled to data path node$_7$ 495. Data path node$_3$ 424 uses transceivers 492, 493 to link to data path node$_7$ 495. Transceiver 493 uses fifth frequency, $f_4$ 484 and transceiver 489 uses second frequency, $f_1$ 442 to link to data path node$_7$ 495. Data path node$_7$ 495 uses three transceivers 494, 496, 499 to link with non-data path node$_{10}$ 472. Transceiver 494 uses fifth frequency, $f_4$ 484, transceiver 499 uses second frequency, $f_1$ 442, and transceiver 496 uses second frequency, $f_1$ 442. Non-data path node$_{10}$ 498 uses one transceiver 497. Transceiver 497 use second frequency, $f_1$ 442 to link with node$_7$ 495. By removing the bottlenecks, richer connectivity may be provided by creating an additional link from node$_0$ 410 to data path node$_2$ 422, an additional link from node$_2$ 422 to data path node$_5$ 464, an additional link from node$_5$ 464 to node$_9$ 468 and an additional link from data path node$_3$ 424 to data path node$_7$ 495.

Accordingly, links to non-data path nodes have been removed and an additional link is created between data path nodes. By requesting non-data path nodes to stop using a transceiver at the non-data path nodes, the data path nodes are able to activate additional, transceivers to use. The additional transceivers at the data path nodes add connectivity between data path nodes which eliminates bottlenecks.

Figure 5:
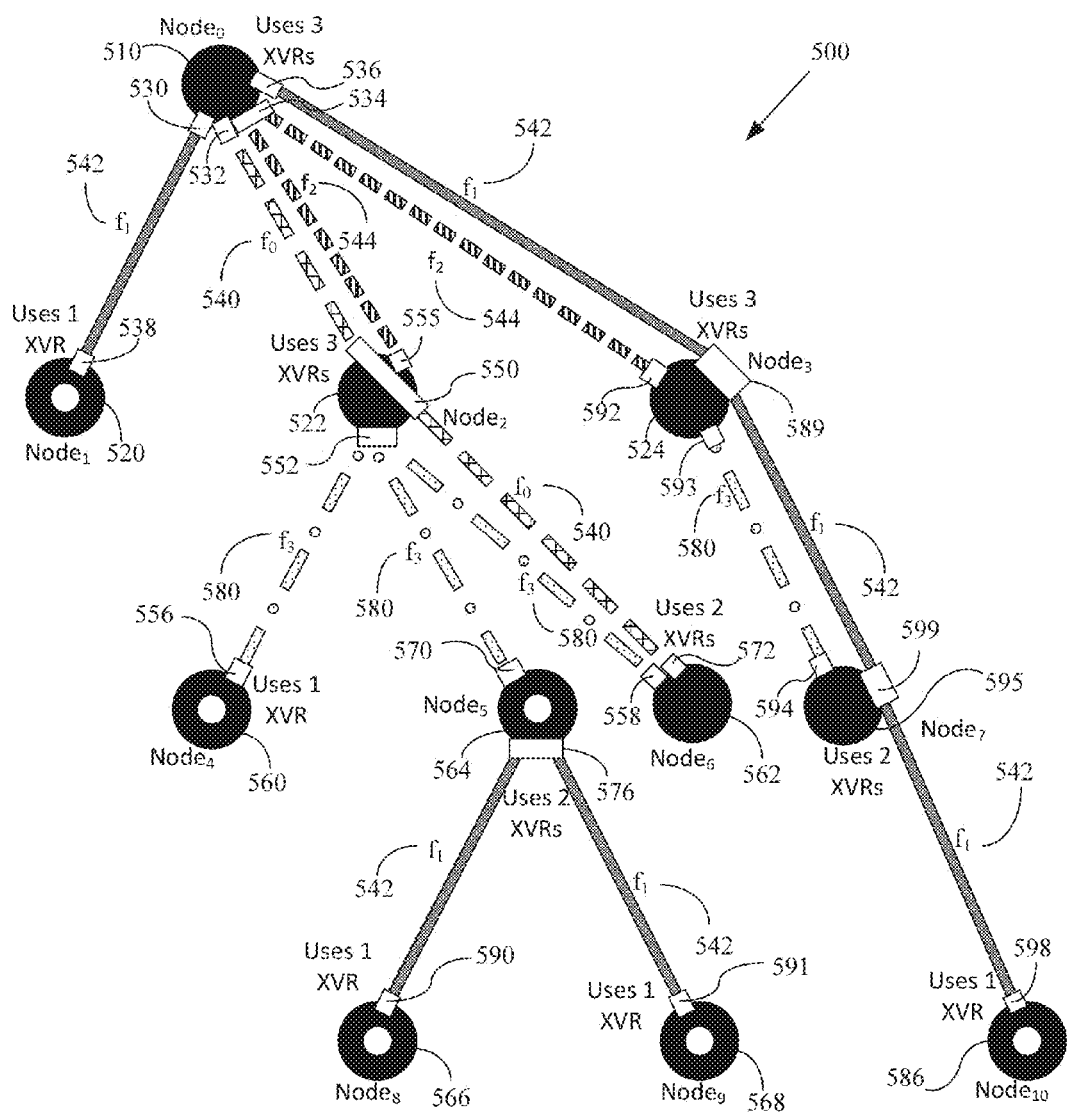
FIG. 5 illustrates a network wherein transceiver resource assignments have been adjusted to accommodate long-term traffic pattern changes according to an embodiment.

FIG. 5 illustrates a network 500 wherein the traffic pattern has significantly changed. The process illustrated with respect to FIGS. 3-4 may be applied to address the change in the traffic pattern. The network 500 thus reflects time $t_2$ where node$_5$ 564, node$_8$ 566 and node$_9$ 568 are now non-data path nodes. By freeing unnecessary transceivers, overall network energy is conserved, but throughput is increased by reusing available transceivers to increase connectivity between traffic-carrying nodes.

In FIG. 5, node$_0$ 510 is at the top of the routing tree. Non-data path node$_1$ 520 and data path nodes, node$_2$ 522, node$_3$ 524, are coupled to node$_0$ 510.

Node$_0$ 510 now uses four transceivers 530, 532, 534, 536. Transceiver 530 is linked to node$_1$ 520, wherein node$_1$ 520 includes one transceiver 538. Transceiver 532 is linked with node$_2$ 522. Transceiver 534 links to both node$_2$ 522 and to node$_3$ 524. First frequency, $f_0$ 540, is used by transceiver 532 to link to node$_2$ 522. Transceiver 530 uses second frequency, $f_1$ 542, to link node$_0$ 510 to node$_1$ 520. However, third frequency, $f_2$ 544, is now used by transceiver 534 to link to both node$_2$ 522 and to node$_3$ 524. Therefore, the bottleneck caused by node$_1$ 520 using two transceivers has been eliminated.

Node$_1$ 520 includes one transceiver 538 to complete the link with transceiver 530 of node$_0$ 510. Node$_2$ 522 now uses 3 transceivers, wherein two transceivers 550, 555 are used to link with node$_0$ 510. Transceiver 550 uses first frequency, f$_0$ 540 and transceiver 553 uses third frequency, f$_2$ 544. Node$_3$ 524 now uses three transceivers 592, 589, 593, wherein transceiver 589 links to both node$_0$ 510 and node$_7$ 595 using second frequency, f$_1$ 542. Transceiver 592 uses third frequency, f$_2$ 544 to complete the link with transceiver 534 of node$_0$ 510. Transceiver 593 uses fourth frequency f$_3$ 580 to form a link with node$_7$ 595. Data path node$_3$ 524 also uses transceivers 589 to link to data path node$_7$ 595 using second frequency, f$_1$ 542.

Non-data path node$_4$ 560 is coupled to data path node$_2$ 522 using transceiver 556 and second frequency, f$_1$ 580. Data path node$_5$ 564 is coupled to data path node$_2$ 522 through transceiver 570 using second frequency, f$_1$ 580. Data path node$_5$ 564 is coupled to non-data path node$_8$ 566 and non-data path node$_9$ 568 through transceiver 576, which uses second frequency, f$_1$ 580. Data path node$_6$ 562 uses transceiver 558 to complete the link with transceiver 552 using fourth frequency, f$_3$ 580. Data path node$_6$ 562 also uses transceiver 572 to complete the link with transceiver 550 using first frequency, f$_0$ 540. Data path node$_7$ 595 is linked to data path node$_3$ 524 via transceiver 594 and transceiver 599. Transceiver 599 uses second frequency, f$_1$ 542 and transceiver 594 uses fourth frequency, f$_3$ 580.

Data path node$_8$ 566 uses transceiver 590 to communicate with transceiver 576 on node$_5$ 564 using second frequency, f$_1$ 542. Data path node$_9$ 568 uses transceiver 591 to complete link with transceiver 576 on node$_5$ 564 using second frequency, f$_1$ 542. Non-data path node$_{10}$ 586 uses one transceivers 598 to complete link with transceiver 599 of node$_7$ 595 using second frequency, f$_1$ 542.

Accordingly, FIG. 5 shows a change in the traffic pattern resulting in node$_5$ 564, node$_8$ 566, and node$_9$ 568 changing to non-data path nodes.

The use of two links between node2 522 and node$_5$ 564, between node$_5$ 564 and node$_8$ 566, and between node$_5$ 564 and node$_9$ 568 have been terminated due to node$_5$ 564, node$_8$ 566, and node$_9$ 568 changing to non-data path nodes.

Now only one link is used between node$_2$ 522 and node$_5$ 564, between node$_5$ 564 and node$_8$ 566, and between node$_5$ 564 and node$_9$ 568.

However, two links are now provided between node$_2$ 522 and node$_6$ 562 because node$_6$ 562 has changed to a data path node.

By freeing unnecessary transceivers on non-data path nodes, energy is conserved, but throughput is increased by reusing available transceivers to increase connectivity between traffic-carrying nodes.

FIGS. 6a-e illustrate the transitioning of the network configuration shown in FIG. 3 to the network configuration shown in FIG. 4 according to an embodiment. FIG. 6a represents the state of the network as shown in FIG. 3. In FIG. 6b, the second link 610 between node$_0$ and node$_1$ has been terminated thereby leaving only one link 612 between node$_0$ and node$_1$. The second link 614 between node$_7$ and node$_{10}$ has been terminated thereby leaving only one link 616 between node$_0$ and node$_1$.

FIG. 6c shows a transition stage where the link 618 between node$_0$ and node$_2$ has been disassembled. The link 620 between node$_2$ and node$_5$ has also been disassembled. One link 622 between node$_5$ and node$_8$ has also been disassembled. In FIG. 6d, two links 624, 626, 628, 630 are shown being established between node$_0$ and node$_2$, between node$_0$ and node$_3$, between node$_2$ and node$_5$, and between node$_5$ and node$_8$, respectively. FIG. 6e shows the transceivers now have frequencies setup for the new links as shown in FIG. 4, i.e., the different dashed line format represent different frequencies.

FIGS. 7a-e illustrate the transitioning of the network configuration shown in FIG. 4 to the network configuration shown in FIG. 5 according to an embodiment. FIG. 5a represents the state of the network as shown in FIG. 4. Open circles represent non-data path nodes, while closed circles represent active data path nodes. In FIG. 7b, node$_5$ is shown changing from a data path node to a non-data path node 710. Node$_6$ is shown changing from a non-data path node to a data path node 712. Node$_8$ and node$_9$ are also shown transitioning 714, 716 to non-data path nodes, respectively.

FIG. 7c shows that the second link 718 between node$_2$ and node$_5$ has been terminated thereby leaving only one link between node$_2$ and node$_5$. The second link 720 between node$_5$ and node$_8$ and the second link 722 between node$_5$ and node$_9$ have also been terminated thereby leaving only one link between node$_5$ and node$_8$, and one link between node$_5$ and node$_9$. FIG. 7d shows a transition stage where new link 724 between node$_0$ and node$_3$, and new link 726 between node$_2$ and node$_6$ have been established. FIG. 7e shows the transceivers now have frequencies setup for the new links as shown in FIG. 5, i.e., the different dashed line format represent different frequencies.

Figure 8:
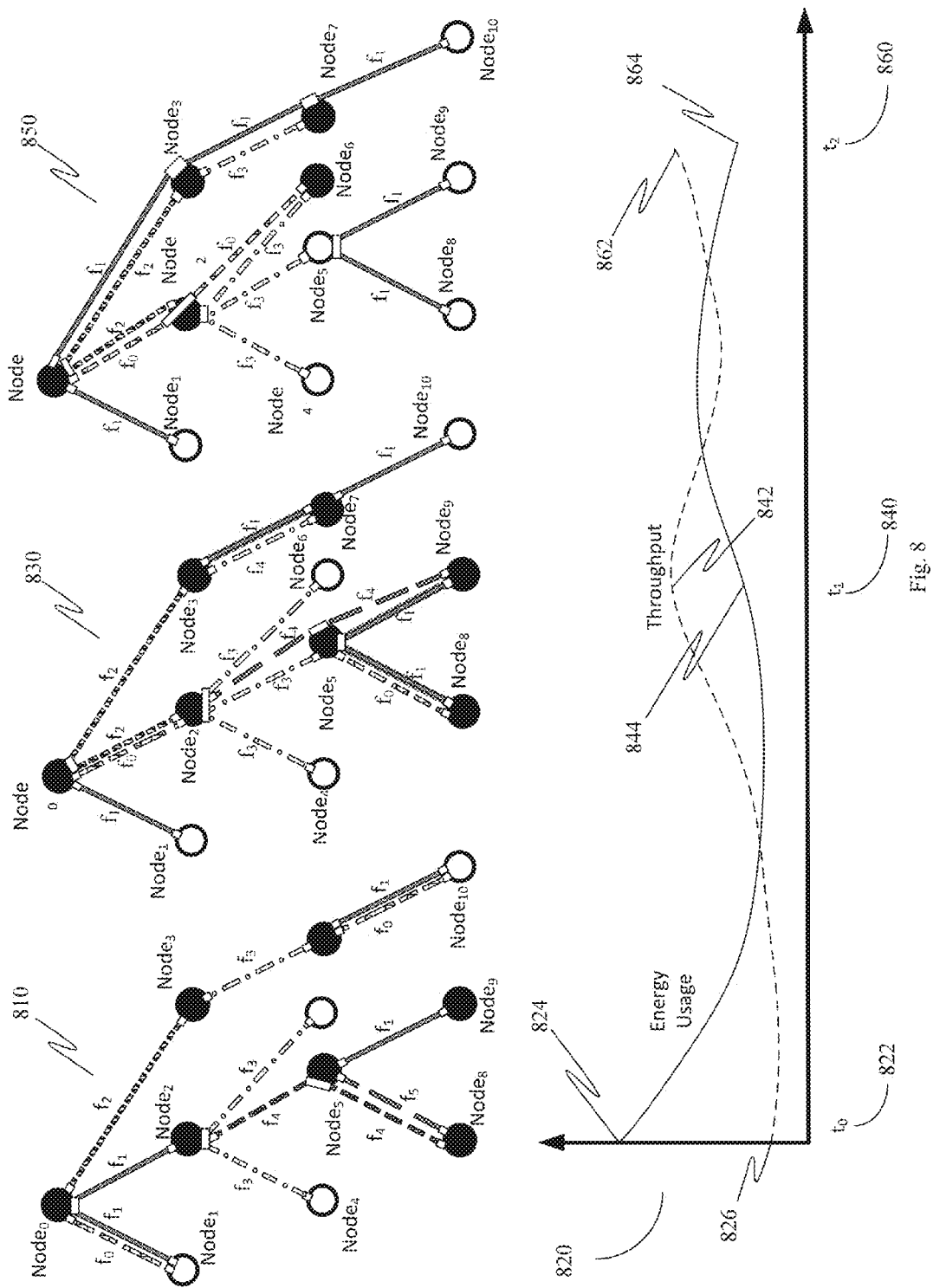
FIG. 8 shows the energy usage and throughput at times $t_0$, $t_1$, and $t_2$ according to an embodiment.

FIG. 8 shows the energy usage and throughput at times t$_0$, t$_1$, and t$_2$ according to an embodiment. The network configuration 810 at time t$_0$ is shown aligned with the energy usage and throughput in graph 820 at time t$_0$ 822. At time t$_0$ 822, the energy usage 824 is high and the throughput 826 is low. This is caused by the inefficient usage of transceivers that result in bottlenecks. Next, the network configuration 830 at time t$_1$ is shown aligned with the energy usage and throughput in graph 820 at time t$_1$ 840. At time t$_1$ 840, the throughput 842 has increased and the energy usage 844 has been decreased. Finally, the network configuration 850 at time t$_2$ is shown aligned with the energy usage and throughput in graph 820 at time t$_2$ 860. At time t$_2$ 860, the throughput 862 is again high and the energy usage 864 is low. Thus, even when traffic patterns change, the network optimizes throughput and minimizes energy usage.

Figure 9:
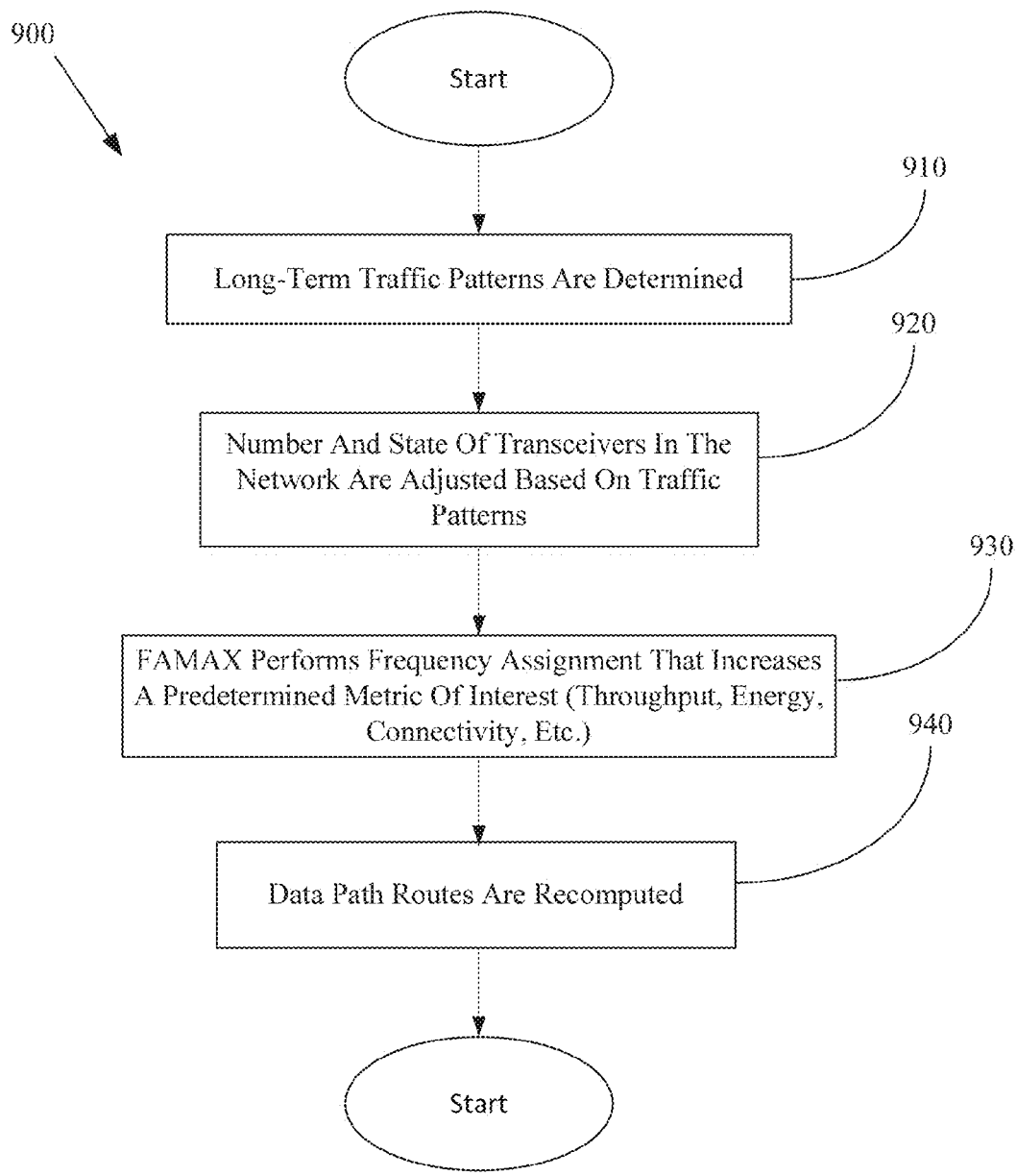
FIG. 9 is a flowchart of a method for managing transceiver resources according to an embodiment.

FIG. 9 is a flowchart of a method for managing transceiver resources 900 according to an embodiment. Long-term traffic patterns are repeatedly determined 910. A number and state of transceivers in the network are repeatedly adjusted based on traffic patterns 920. FAMAX repeatedly performs frequency assignment that increases a predetermined metric of interest (throughput, energy, connectivity, delay and reliability, etc.) 930. Data path routes are recomputed 940.

For example, if the metric is connectivity, poorly connected neighbors may be favored at the time of assigning available transceivers. Eligible frequencies that connect to the greatest number of potential neighbors, e.g., nodes that would be neighbors if they shared the same frequency, are used. If, on the other hand, the metric is a measure of capacity, eligible frequencies will be selected to increase the number of links to previous and next-hop neighbors. When it is determined that using fewer transceivers is desired, the order of importance of currently assigned channel is computed in order to preserve the highest level of metric. For example, if connectivity is of importance to the network, the channel that takes away the smallest number of neighbors may be removed.

The above detailed description includes references to the accompanying drawings, which form a part of the detailed description. The drawings show, by way of illustration, specific embodiments that may be practiced. These embodiments are also referred to herein as "examples." Such examples can include elements in addition to those shown or described. However, the present inventors also contemplate examples in which those elements shown or described are provided.

Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are therefore not necessarily meant to indicate order in a series, list or sequence.

The above description is intended to be illustrative, and not restrictive. For example, the above-described examples (or one or more aspects thereof) may be used in combination. Other embodiments can be used, such as by one of ordinary skill in the art upon reviewing the above description. The Abstract is to allow the reader to quickly ascertain the nature of the technical disclosure, for example, to comply with 37 C.F.R. §1.72(b). It is submitted with the understanding that it will not be used to interpret or limit the scope or meaning of the claims. Also, in the above Detailed Description, various features may be grouped together to streamline the disclosure. An unclaimed disclosed feature may not be used by any claim. Rather, inventive subject matter may lie in fewer than the features of a particular disclosed embodiment. Thus, the following claims are hereby incorporated into the Detailed Description, wherein a claim stands on its own as a separate embodiment. The scope of the embodiments is to be determined with reference to the appended claims, along with the full scope of equivalents to which such claims are entitled.

What is claimed is:

1. A method for optimizing frequency assignment, comprising:
   determining long-term traffic patterns based on a number and state of transceivers, wherein the state of the transceivers comprises: on and assigned a frequency and receiving or sending or on and not assigned a frequency and searching;
   dynamically adjusting the number and state of the transceivers in the network based on the traffic patterns;
   dynamically performing frequency assignment of one or a plurality of transceivers to one or a plurality of neighbor nodes, that increases a throughput metric or an energy metric, based on the state of the transceivers and traffic patterns; and
   re-computing data path routes based on the traffic patterns and the throughput metric or the energy metric.

2. The method of claim 1, wherein at least one of the determining long-term traffic patterns, the adjusting the number and state of transceivers in the network based on traffic patterns, the performing frequency assignment that increases the throughput metric or the energy metric; and the re-computing data path routes are repeatedly performed.

3. The method of claim 1, wherein performing frequency assignment increases a connectivity metric.

4. The method of claim 1, further comprising identifying a transceiver is assigned when the transceiver is on and ready for communication, identifying a transceiver is unassigned when a transceiver is on, but not given a frequency on which to communicate, and identifying a transceiver is inactive when a transceiver has been turned off.

5. The method of claim 1, further comprising comparing the re-computed data path routes to a predetermined metric by-determining a type of metric to use for the comparison.

6. The method of claim 5, wherein the adjusting the number and state of the transceivers in the network is based on the comparison of the re-computed data path routes and the metric further comprises favoring neighboring nodes having weak connections when available transceivers are assigned and using available frequencies that connect to a greatest number of potential neighboring nodes.

7. The method of claim 5, wherein the adjusting the number and state of the transceivers in the network is based on the comparison of the re-computed data path routes and the metric further comprises selecting available frequencies that increase the number of links to previous-hop neighboring nodes and next-hop neighboring nodes.

8. The method of claim 1, further comprising comparing re-computed data path routes to a predetermined metric by comparing the re-computed data path routes to capacity.

9. The method of claim 1, further comprising determining that fewer transceiver may be used and computing an order of importance for currently assigned frequency channel, and wherein the adjusting an assignment of the transceivers in the network based on the comparison of the re-computed data path routes and the metric further comprises adjusting an assignment of the transceivers in the network based on selecting a computed order of importance for currently assigned frequency channel that maximizes the metric.

10. A node in a network, comprising:
    at least one transceiver to transmit and receive packets in a network of nodes;
    memory, coupled to the at least one transceiver, to store packets for the at least one transceiver; and
    a processor, coupled to the memory and the at least one transceiver, wherein the processor is arranged to implement a transceiver resource manager, the transceiver resource manager arranged to determine a number of links and state of at least a portion of transceivers in a network, to identify long-term traffic patterns from the determined number of links and state of the at least the portion of transceivers in the network, to dynamically perform frequency assignment of one or a plurality of transceivers to one or a plurality of neighbor nodes, that increases a throughput metric or an energy metric based on the state of the transceivers and the traffic patterns, and to re-compute path routes based on the traffic patterns and the throughput metric or the energy metric, wherein the state of the transceivers comprises:
    on and assigned a frequency and receiving or sending or on and not assigned a frequency and searching.

11. The node of claim 10 wherein the transceiver resource manager is further arranged to perform repeatedly at least one of the determining long-term traffic patterns, the adjusting the number and state of transceivers in the network based on traffic patterns, the performing frequency assignment that increases a predetermined metric of interest; and the re-computing data path routes.

12. The node of claim 10 wherein the processor is further arranged to assign transceivers to adjust a delay metric or a reliability metric.

13. The node of claim 10 wherein the transceiver resource manager determines the number of links and state of at least a portion of transceivers in a network by determining when one of the at least the portion of transceivers is assigned, unassigned and inactive.

14. The node of claim 13, wherein the transceiver resource manager identifies a transceiver is assigned when the transceiver is on and ready for communication, identifies a transceiver is unassigned when a transceiver is on, but not given a frequency on which to communicate, and identifies a transceiver is inactive when a transceiver is has been turned off.

15. The node of claim 10, wherein the transceiver resource manager determines a type of metric to use for a comparison.

16. The node of claim 15, wherein, when the metric comprises connectivity, the transceiver resource manager adjusts assignments of the transceivers in the network based on connectivity by favoring neighboring nodes having weak connections when available transceivers are assigned and using available frequencies that connect to a greatest number of potential neighboring nodes, and wherein, when the metric comprises capacity, the transceiver resource manager adjusts assignments of the transceivers in the network based on capacity by selecting available frequencies that increase the number of links to previous-hop neighboring nodes and next-hop neighboring nodes.

17. The node of claim 15, wherein the transceiver resource manager adjusts the assignment of the transceivers in the network based on the comparison of the re-computed data path routes and the metric by selecting available frequencies that increase the number of links to previous-hop neighboring nodes and next-hop neighboring nodes.

18. The node of claim 10, wherein the transceiver resource manager, based on the comparing the re-computed data path routes to a predetermined metric, determines that fewer transceiver may be used and computes an order of importance for currently assigned frequency channel, and wherein the transceiver resource manager adjusts an assignment of the transceivers in the network by adjusting an assignment of the transceivers in the network based on selecting a computed order of importance for currently assigned frequency channel that maximizes the metric.

19. A system comprising:
a communications network including a sending node in the communications network and a plurality of nodes that neighbor the sending node, wherein the sending node includes:
at least one transceiver to transmit and receive packets, each transceiver having a state comprising: on and assigned a frequency and receiving or sending or on and not assigned a frequency and searching;
memory, coupled to the at least one transceiver, to provide at least one queue for storing packets for the at least one transceiver; and
a transceiver resource manager, coupled to the memory and the at least one transceiver, the transceiver resource manager arranged to dynamically determine a number of links and state of at least a portion of transceivers in the communications network, to identify long-term traffic patterns from the determined number of links and state of the at least the portion of transceivers in the communications network, to dynamically re-compute data path routes based on the identified long-term traffic patterns and assigned frequencies and to dynamically adjust an assignment of the transceivers in the network based on a comparison of the number and state of transceivers and a metric to improve throughput and energy consumption in the network, and dynamically perform frequency assignments of one or a plurality of transceivers to one or a plurality of neighbor nodes, that increases a throughput metric or an energy metric, based on the state of the transceivers and traffic patterns.

20. The system of claim 19 wherein the transceiver resource manager is further arranged to perform repeatedly at least one of the determining long-term traffic patterns, the adjusting the number and state of transceivers in the network based on traffic patterns, the performing frequency assignment that increases a predetermined metric of interest; and the re-computing data path routes.

21. The system of claim 19 wherein the metric includes one chosen from a group consisting of throughput, energy, and connectivity.

22. The system of claim 19 wherein the transceiver resource manager determines the number of links and state of at least a portion of transceivers in a network by determining when one of the at least the portion of transceivers is assigned, unassigned and inactive.

23. The system of claim 19, wherein, when the metric comprises connectivity, the transceiver resource manager adjusts assignments of the transceivers in the network based on connectivity by favoring neighboring nodes having weak connections when available transceivers are assigned and using available frequencies that connect to a greatest number of potential neighboring nodes, and wherein, when the metric comprises capacity, the transceiver resource manager adjusts assignments of the transceivers in the network based on capacity by selecting available frequencies that increase the number of links to previous-hop neighboring nodes and next-hop neighboring nodes.

24. The system of claim 19, wherein the transceiver resource manager adjusts the assignment of the transceivers in the network based on the comparison of the re-computed data path routes and the metric by selecting available frequencies that increase the number of links to previous-hop neighboring nodes and next-hop neighboring nodes, and wherein the transceiver resource manager, based on the comparing the re-computed data path routes to a predetermined metric, determines that fewer transceivers may be used and computes an order of importance for currently assigned frequency channels, and wherein the transceiver resource manager adjusts an assignment of the transceivers in the network based on selecting a computed order of importance for currently assigned frequency channel that maximizes the metric.

* * * * *